US011811111B2

(12) United States Patent
Sugata

(10) Patent No.: US 11,811,111 B2
(45) Date of Patent: Nov. 7, 2023

(54) CONTROL METHOD FOR FUEL CELL SYSTEM

(71) Applicant: TOYOTA JIDOSHA KABUSHIKI KAISHA, Aichi-ken (JP)

(72) Inventor: Hiroyuki Sugata, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/724,492

(22) Filed: Apr. 20, 2022

(65) Prior Publication Data

US 2022/0376283 A1 Nov. 24, 2022

(30) Foreign Application Priority Data

May 19, 2021 (JP) .................................. 2021-084629

(51) Int. Cl.
*H01M 8/04664* (2016.01)
*H01M 8/04858* (2016.01)

(52) U.S. Cl.
CPC ... *H01M 8/04664* (2013.01); *H01M 8/04671* (2013.01); *H01M 8/04858* (2013.01); *H01M 8/04932* (2013.01); *H01M 2250/20* (2013.01)

(58) Field of Classification Search
CPC ......... H01M 8/04313; H01M 8/04537–04686; H01M 8/04694; H01M 8/04858–04953
See application file for complete search history.

(56) References Cited

U.S. PATENT DOCUMENTS

| 6,399,231 | B1 * | 6/2002 | Donahue | H01M 8/04238 429/432 |
| 2009/0155635 | A1 * | 6/2009 | Cho | H01M 8/043 429/429 |
| 2009/0226771 | A1 | 9/2009 | Kaneko | |
| 2010/0112401 | A1 * | 5/2010 | Noto | H01M 8/04589 702/63 |

FOREIGN PATENT DOCUMENTS

| JP | 200712375 A | 1/2007 | |
| JP | 2008218100 A | 9/2008 | |
| JP | 2013038032 A | * 2/2013 | ........... Y02E 60/521 |
| JP | 2020181665 A | 11/2020 | |

OTHER PUBLICATIONS

Machine Translation of Kato (JP 2013-038032). Originally Published Feb. 21, 2013. (Year: 2013).*

* cited by examiner

*Primary Examiner* — Jonathan Crepeau
*Assistant Examiner* — Jacob Buchanan
(74) *Attorney, Agent, or Firm* — HAUPTMAN HAM, LLP

(57) ABSTRACT

A control method for a fuel cell system includes: acquiring a poisoning rate of an electrode catalyst of a fuel cell; performing a potential maintaining operation of maintaining a potential of the fuel cell in a first potential range when the poisoning rate of the electrode catalyst is greater than a prescribed value α; and performing a potential changing operation of repeating a cycle in which the potential of the fuel cell is changed between an upper-limit potential and a lower-limit potential of a second potential range which is higher than the first potential range after the potential maintaining operation has been performed.

4 Claims, 5 Drawing Sheets

CONTROL METHOD FOR FUEL CELL SYSTEM

CROSS-REFERENCE TO RELATED APPLICATION

This application claims priority to Japanese Patent Application No. 2021-084629 filed on May 19, 2021, incorporated herein by reference in its entirety.

BACKGROUND

1. Technical Field

The disclosure relates to a control method for a fuel cell system.

2. Description of Related Art

In a fuel cell, in addition to a main reaction ($2H^+ + 2e^- + (1/2)O_2 \rightarrow H_2O$), a side reaction ($2H^+ + O_2 + 2e^- \rightarrow H_2O_2$) occurs at the time of generation of electric power. Hydrogen peroxide ($H_2O_2$) produced in the side reaction reacts with Fe which has flowed as impurities into a membrane electrode assembly (MEA) to produce radicals. The radicals attack an electrolyte membrane and thus an electrolyte material thereof is damaged. As a result, a decrease in performance of the fuel cell may occur due to a decrease in conductivity of protons ($H^+$). Due to excessive damage to the electrolyte material, holes may be formed in the electrolyte membrane, hydrogen may leak from an anode to a cathode, and thus a decrease in fuel efficiency may occur. In the worst case, a vehicle may stop moving. Various techniques have been proposed in order to solve this problem.

For example, Japanese Unexamined Patent Application Publication No. 2007-12375 (JP 2007-12375 A) discloses a means that replenishes and complexes hydrogen peroxide and removes the hydrogen peroxide from a fuel cell by adding $Ti(SO_4)_2$ to an electrolyte material in advance. Japanese Unexamined Patent Application Publication No. 2008-218100 (JP 2008-218100 A) discloses a means that coats a part of an edge of an electrolyte membrane, a surface of which has not been coated with an electrode, with a seal member and adds a peroxide decomposing catalyst to at least a part of the seal member with which the electrolyte membrane is coated.

In the means disclosed in JP 2007-12375 A, JP 2008-218100 A, and the like, after hydrogen peroxide has been produced in the fuel cell, hydrogen peroxide detoxification is performed by removing the hydrogen peroxide from the fuel cell through replenishment or decomposition of the hydrogen peroxide. However, these means are for taking measures after hydrogen peroxide is produced, but not for taking measures before hydrogen peroxide is produced. Since a particular additive needs to be used for a fuel cell to perform hydrogen peroxide detoxification, the influence of the conflict between cost and performance due to addition of the additive needs to be sufficiently considered. When more hydrogen peroxide than expected is produced, the amount of hydrogen peroxide produced cannot be determined from the outside and thus it is not clear whether an amount of additive added before the fuel cell operates will be an appropriate amount required for satisfactorily performing hydrogen peroxide detoxification.

On the other hand, Japanese Unexamined Patent Application Publication No. 2020-181665 (JP 2020-181665 A) discloses a control method for a fuel cell system that prevents production of hydrogen peroxide based on the two facts that 1) a production rate of hydrogen peroxide in a fuel cell is slight when a poisoning rate of an electrode catalyst is less than a threshold value $\gamma$ and 2) the poisoning rate of the electrode catalyst can be decreased through a potential changing operation of repeatedly changing a potential of the fuel cell between a high potential and a low potential. In this method, the poisoning rate of the electrode catalyst is predicted from curves of reduction waves and oxidation waves acquired by cyclic voltammetry and it is estimated that a production rate of hydrogen peroxide becomes greater than a prescribed value and suddenly increases when the poisoning rate of the electrode catalyst is greater than the threshold value. In this case, a production rate of hydrogen peroxide in the electrode catalyst is decreased by performing the potential changing operation of repeatedly changing the potential of the fuel cell between a high potential and a low potential and decreasing the poisoning rate of the electrode catalyst.

SUMMARY

However in the control method for a fuel cell system disclosed in JP 2020-181665 A, when the potential of the fuel cell is repeatedly changed between a high potential and a low potential in the potential changing operation, extraction and reaggregation of a catalyst metal such as platinum used as a catalyst included in the electrode may be repeated and thus catalyst metal particles may coarsen. Accordingly, a surface area of catalyst metal particles contributing to reactions may decrease and the catalyst included in the electrode may deteriorate. As a result, there is concern of a decrease in performance of the fuel cell.

The disclosure provides a control method for a fuel cell system that can curb deterioration of a catalyst.

According to an aspect of the disclosure, there is provided a control method for a fuel cell system, the control method including: acquiring a poisoning rate of an electrode catalyst of a fuel cell; performing a potential maintaining operation of maintaining a potential of the fuel cell in a first potential range when the poisoning rate of the electrode catalyst is greater than a prescribed value $\alpha$; and performing a potential changing operation of repeating a cycle in which the potential of the fuel cell is changed between an upper-limit potential and a lower-limit potential of a second potential range which is higher than the first potential range after the potential maintaining operation has been performed.

With the fuel cell system according to the disclosure, it is possible to curb deterioration of a catalyst.

The control method for a fuel cell system may further include calculating the number of cycles of the potential changing operation in which the poisoning rate of the electrode catalyst is able to be decreased to a target value as an optimal number of cycles based on a predetermined relationship between the number of cycles of the potential changing operation and the poisoning rate of the electrode catalyst. The potential changing operation may include repeating the cycle a number of times corresponding to the optimal number of cycles.

According to the disclosure, it is possible to curb deterioration of a catalyst.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a control method for a fuel cell system according to an embodiment of the disclosure will be described. The control method for a fuel cell system according to the embodiment is a control method for a fuel cell system including: acquiring a poisoning rate of an electrode catalyst of a fuel cell element (a poisoning rate acquiring step); performing a potential maintaining operation of maintaining a potential of the fuel cell element in a first potential range when the poisoning rate of the electrode catalyst is greater than a prescribed value α (a potential maintaining operation performing step); and performing a potential changing operation of repeating a cycle in which the potential of the fuel cell element is changed between an upper-limit potential and a lower-limit potential of a second potential range which is higher than the first potential range after the potential maintaining operation has been performed (a potential changing operation performing step).

An example of the control method for a fuel cell system according to the embodiment will be schematically described below.

Fuel Cell System

Figure 1:
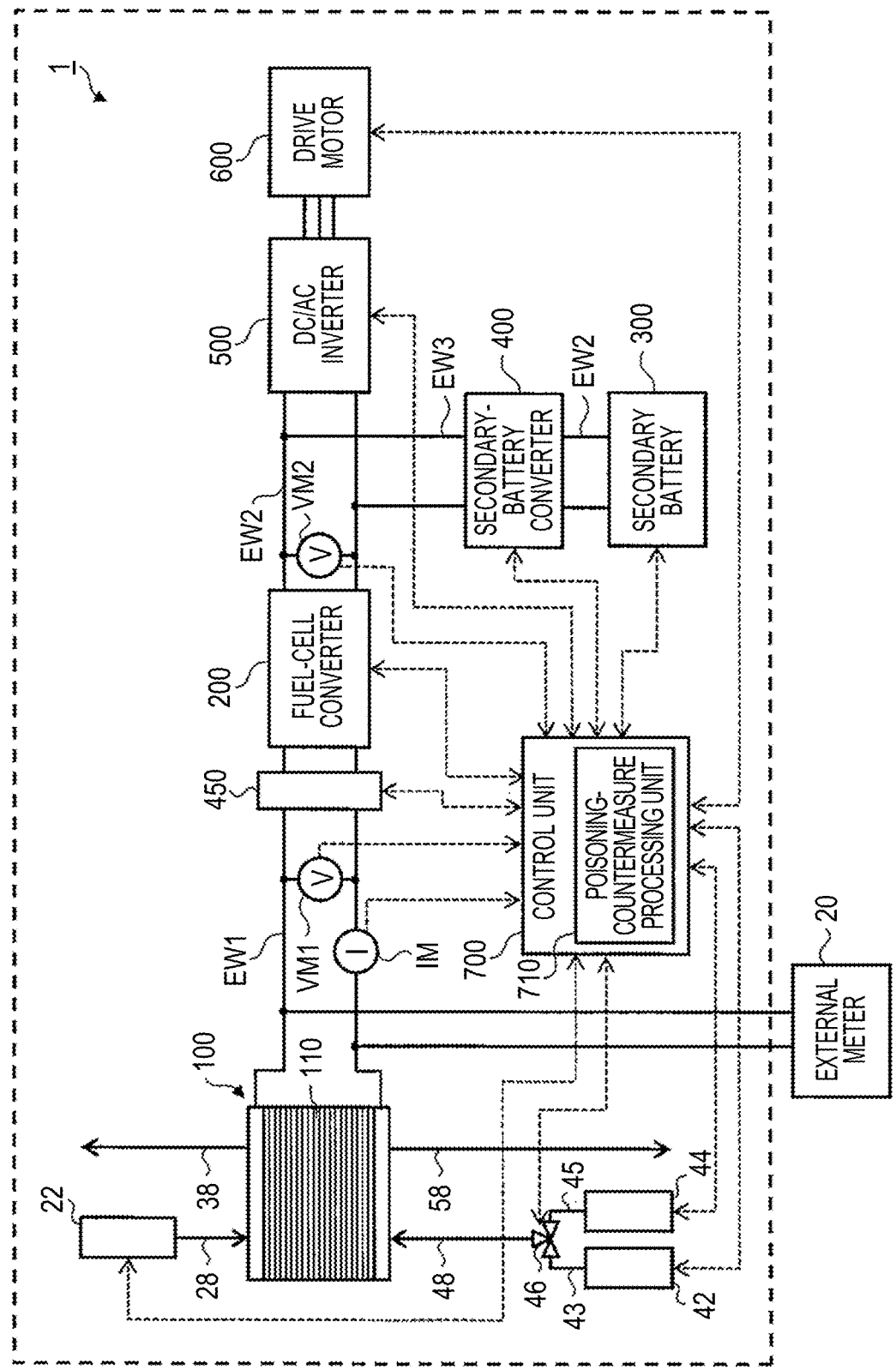
FIG. 1 is a diagram schematically illustrating a configuration of a fuel cell system that performs a control method for a fuel cell system according to an embodiment.

First, a fuel cell system that performs the control method for a fuel cell system will be described below before the control method for a fuel cell system according to the embodiment is described. FIG. 1 is a diagram schematically illustrating a configuration of a fuel cell system that performs a control method for a fuel cell system according to this embodiment.

As illustrated in FIG. 1, the fuel cell system 1 according to the embodiment includes a fuel cell 100, a fuel-cell converter 200, a secondary battery 300, a secondary-battery converter 400, a switch circuit 450, a DC/AC inverter 500, a drive motor 600, and a control unit 700.

The fuel cell system 1 further includes a fuel-cell wire EW1, a secondary-battery wire EW2, and a direct-current wire EW3. The fuel-cell wire EW1 electrically connects the fuel cell 100 and the fuel-cell converter 200. The secondary-battery wire EW2 electrically connects the secondary battery 300 and the secondary-battery converter 400. The direct-current wire EW3 connects the fuel-cell converter 200 and the secondary-battery converter 400 in parallel to the DC/AC inverter 500.

The fuel cell 100 is a solid polymer fuel cell and generates direct-current electric power. The fuel cell 100 generates electric power by allowing hydrogen gas ($H_2$) and oxygen gas ($O_2$) supplied to a fuel-cell element 110 to react with each other in an electrochemical reaction. Electric power generated by the fuel cell 100 is input to the fuel-cell converter 200, the secondary-battery converter 400, and the DC/AC inverter 500 via the fuel-cell wire EW1.

The fuel cell 100 has a stacked structure in which a plurality of fuel-cell elements 110 which is a unit module for power generation is stacked. Each fuel-cell element 110 includes an electrolyte membrane formed of a polymer ion-exchange membrane. Each fuel-cell element 110 includes, for example, an anode electrode on one side of the electrolyte membrane and a cathode electrode on the other side of the electrolyte membrane. The anode electrode is a reaction field in which an electrode reaction on the anode side progresses and includes a catalyst for promoting an electrode reaction in the vicinity of a contact surface with the electrolyte membrane. The cathode electrode is a reaction field in which an electrode reaction on the cathode side progresses and includes a catalyst in the vicinity of a contact surface with the electrolyte membrane similarly to the anode electrode. Here, "electrode catalyst" indicates the catalyst included in the cathode electrode.

The fuel-cell converter 200 is a step-up converter that steps up an output voltage of the fuel cell 100 to a target voltage and outputs the stepped-up voltage. The fuel-cell converter 200 is electrically connected to the DC/AC inverter 500 via the direct-current wire EW3.

The secondary battery 300 along with the fuel cell 100 serves as a power source of the fuel cell system 1. The secondary battery 300 is charged with electric power generated by the fuel cell 100. The secondary battery 300 inputs the charged electric power to the drive motor 600. The secondary battery 300 is formed of a lithium-ion battery. The secondary battery 300 may be another type of battery such as a lead storage battery, a nickel-cadmium battery, or a nickel-hydride battery.

The secondary-battery converter 400 is a step-up/down converter device and has a configuration similar to that of the fuel-cell converter 200. The secondary-battery converter 400 adjusts the voltage of the secondary-battery wire EW2 and controls charging/discharging of the secondary battery 300. The secondary-battery converter 400 causes the secondary battery 300 to discharge electric power when output power of the fuel-cell converter 200 is not sufficient for a target. On the other hand, the secondary-battery converter 400 causes the secondary battery 300 to be charged with regenerative electric power when the regenerative electric power is generated in the drive motor 600. The secondary-battery converter 400 may have a configuration different from that of the fuel-cell converter 200.

The switch circuit 450 is disposed between the fuel cell 100 and the fuel-cell converter 200 and is a switch circuit that switches the polarity of an electrode of the fuel cell 100 connected to the secondary battery 300 in a proton pumping process which will be described later when the fuel cell 100 generates electric power.

The DC/AC inverter 500 converts electric power supplied as DC electric power from the fuel cell 100 and the secondary battery 300 via the direct-current wire EW3 to three-phase alternating-current (AC) electric power. The DC/AC inverter 500 is electrically connected to the drive motor 600 via an AC wire and supplies three-phase AC electric power to the drive motor 600. The DC/AC inverter 500 converts regenerative electric power generated by the drive motor 600 under the control of the control unit 700 and inputs the DC electric power to the secondary battery 300 via the direct-current wire EW3.

The drive motor 600 constitutes a main power source of the fuel cell system 1. The drive motor 600 is an electric motor that converts three-phase AC electric power supplied from the DC/AC inverter 500 to rotational power.

The fuel cell system 1 further includes an anode gas supply unit 22, an anode gas supply passage 28, and an anode gas discharge passage 38. The fuel cell system 1 further includes an oxygen gas supply unit 42, an oxygen gas supply passage 43, a nitrogen gas supply unit 44, a nitrogen gas supply passage 45, a switching valve 46, a cathode gas supply passage 48, and a cathode gas discharge passage 58.

The anode gas supply unit 22 is a unit that supplies hydrogen gas to each fuel-cell element 110 of the fuel cell 100. The anode gas supply unit 22 may include, for example, a hydrogen container that stores hydrogen gas in a pressurized state and an adjustment valve that adjusts an amount of supplied hydrogen gas. The anode gas supply unit 22 is connected to an end of a flow passage of hydrogen gas in the fuel cell 100 via the anode gas supply passage 28. Exhaust gas which is anode gas is discharged to the outside of the fuel cell system 1 via the anode gas discharge passage 38.

The oxygen gas supply unit 42 is a unit that supplies air including oxygen gas to each fuel-cell element 110 of the fuel cell 100. The oxygen gas supply unit 42 may include, for example, an air pump that can adjust an amount of supplied oxygen gas. The oxygen gas supply unit 42 is connected to an end of a flow passage of cathode gas in the fuel cell 100 via the oxygen gas supply passage 43 and the cathode gas supply passage 48.

The nitrogen gas supply unit 44 is a unit that supplies nitrogen gas ($N_2$) which is non-oxygen gas not including oxygen gas to each fuel-cell element 110 of the fuel cell 100. The nitrogen gas supply unit 44 may include, for example, a nitrogen container and an adjustment valve that adjusts an amount of supplied nitrogen gas. The nitrogen gas supply unit 44 is connected to an end of the flow passage of cathode gas in the fuel cell 100 via the nitrogen gas supply passage 45 and the cathode gas supply passage 48.

A connection portion of the oxygen gas supply passage 43, the nitrogen gas supply passage 45, and the cathode gas supply passage 48 is provided with the switching valve 46. By switching the switching valve 46, a state in which oxygen gas can be supplied to each fuel-cell element 110 via the oxygen gas supply passage 43 and the cathode gas supply passage 48 and a state in which nitrogen gas can be supplied to each fuel-cell element 110 via the nitrogen gas supply passage 45 and the cathode gas supply passage 48 can switch therebetween. Cathode exhaust gas is discharged to the outside of the fuel cell system 1 via the cathode gas discharge passage 58.

The fuel cell system 1 further includes a first voltage meter VM1, a current meter IM, and a second voltage meter VM2. The first voltage meter VM1 and the current meter IM are provided in the fuel-cell wire EW1. The second voltage meter VM2 is provided in the direct-current wire EW3.

The first voltage meter VM1 measures an output voltage of the fuel cell 100 and inputs the measured output voltage as a signal to the control unit 700. The current meter IM measures an output current of the fuel cell 100 and inputs the measured output current as a signal to the control unit 700. The second voltage meter VM2 measures an output voltage of the fuel-cell converter 200 and inputs the measured output voltage as a signal to the control unit 700.

The control unit 700 can control the constituent units of the fuel cell system 1. The control unit 700 includes a poisoning-countermeasure processing unit 710 as a functional unit. The control unit 700 performs a control method for a fuel cell system which will be described later by transmitting and receiving signals such as a drive signal to and from the constituent units of the fuel cell system 1 as indicated by dotted arrows in FIG. 1.

Control Method for Fuel Cell System

Figure 2:
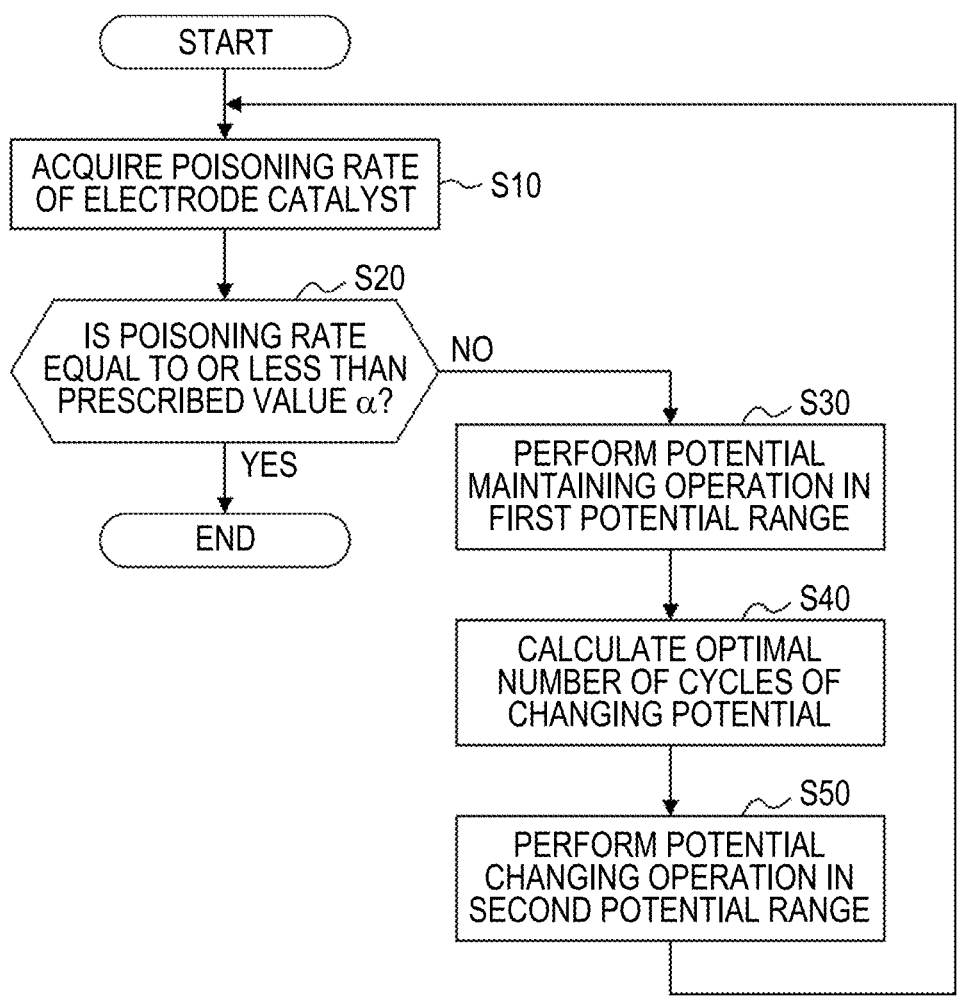
FIG. 2 is a flowchart illustrating the control method for a fuel cell system according to the embodiment.

A control method for a fuel cell system according to an embodiment will be described below. FIG. 2 is a flowchart illustrating the control method for a fuel cell system according to this embodiment.

In the control method for a fuel cell system according to the embodiment, first, a poisoning rate of an electrode catalyst of each fuel-cell element 110 is calculated as illustrated in FIG. 2 (a poisoning rate acquiring step S10).

In the poisoning rate acquiring step S10, as illustrated in FIG. 1, an external meter 20 is electrically connected to the fuel cell 100, and a current density Pa when the potential of the fuel-cell element 110 is 0.9 V is measured by cyclic voltammetry using the external meter 20. Then, the poisoning rate of the electrode catalyst of the fuel-cell element 110 is calculated from the current density Pa when the potential of the fuel-cell element 110 is 0.9 V using Expression (1) which will be described later. Details thereof will be described below.

Figure 3:
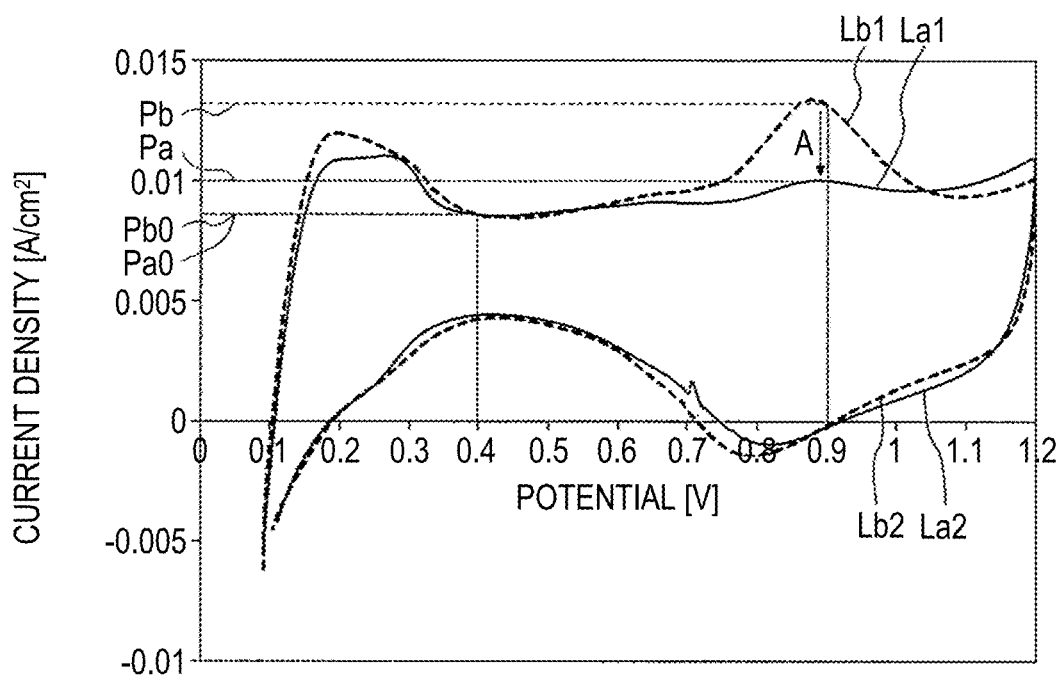
FIG. 3 is a graph illustrating a result of measurement of a change in current density when a potential of a fuel cell element has been swept using cyclic voltammetry in the control method for a fuel cell system according to the embodiment.

FIG. 3 is a graph illustrating a result of measurement of a change in current density when the potential of a fuel cell element has been swept using cyclic voltammetry in the control method for a fuel cell system according to the embodiment. In FIG. 3, La1 and La2 are curves representing a current density in a state in which the electrode catalyst of the fuel-cell element 110 is poisoned by a poisoning contributor (such as an organic material having a polar functional group), where La1 represents reduction waves which are generated when the potential of the fuel-cell element 110 is swept from a high potential to a low potential and La2 represents oxidation waves which are generated when the potential of the fuel-cell element 110 is swept from a low potential to a high potential. On the other hand, Lb1 and Lb2 are curves representing a current density in a state in which the electrode catalyst of the fuel-cell element 110 is not poisoned, where Lb1 represents reduction waves which are generated when the potential of the fuel-cell element 110 is swept from a high potential to a low potential and Lb2 represents oxidation waves which are generated when the potential of the fuel-cell element 110 is swept from a low potential to a high potential. As illustrated in FIG. 3, in the curve Lb1, the current density is maximized when the potential of the fuel-cell element 110 is close to 0.9 V. The potential when the current density is maximized is a potential at which an adsorption rate of oxygen on the electrode catalyst of the fuel-cell element 110 required for generating electric power is maximized. In the state in which the electrode catalyst of the fuel-cell element 110 is poisoned, adsorption of oxygen on the electrode catalyst is hindered. Accordingly, in the curve La1, the current density when the potential of the fuel-cell element 110 is 0.9 V is less than that in the curve Lb1 as indicated by an arrow A. On the other hand, in the curves La1 and Lb1, the adsorption rate of oxygen on the electrode catalyst of the fuel-cell element 110 is minimized when the potential of the fuel-cell element 110 is close to 0.4 V. The state in which the electrode catalyst of the fuel-cell element 110 is not poisoned is a state in which the current density has been saturated when the potential of the fuel-cell element 110 becomes 0.9 V by repeating one cycle of the potential changing operation on the fuel-cell element 110 in the state in which the electrode catalyst is poisoned (a state in which the poisoning rate of the electrode catalyst is 70%) as will be described later 100 times.

As described above, the poisoning rate of the electrode catalyst of the fuel-cell element 110 can be calculated based on the decrease in current density indicated by the arrow A. Specifically, when Pa defines the current density when the potential is 0.9 V in the curve La1, Pa0 defines the current density when the potential is 0.4 V in the curve La1, Pb defines the current density when the potential is 0.9 V in the curve Lb1, and Pb0 defines the current density when the potential is 0.4 V in the curve Lb1, the poisoning rate of the electrode catalyst of the fuel-cell element 110 is defined by Expression (1).

$$\text{Poisoning rate of electrode catalyst} = (1 - (Pa - Pa0)/(Pb - Pb0)) \times 100 \quad (1)$$

The current density Pb is a current density when the electrode catalyst of the fuel-cell element 110 is not poisoned and thus is constant. The current density Pa decreases with respect to Pb with the progress of poisoning of the electrode catalyst of the fuel-cell element 110. On the other hand, the current densities Pa0 and Pb0 are determined based on characteristics of the electrode catalyst of the fuel-cell element 110 and are the same. Accordingly, the poisoning rate of the electrode catalyst defined by Expression (1) is 0% because Pa=Pb is satisfied when poisoning of the electrode catalyst of the fuel-cell element 110 does not progress, and increases with the progress of poisoning of the electrode catalyst. In the poisoning rate acquiring step S10, the current density Pa when the potential of the fuel-cell element 110 is 0.9 V is measured as described above, and the poisoning rate of the electrode catalyst of the fuel-cell element 110 is calculated from the current density Pa using Expression (1).

Then, as illustrated in FIG. 2, it is determined whether the poisoning rate of the electrode catalyst calculated in the poisoning rate acquiring step S10 is equal to or less than a prescribed value α (a determination step S20).

Figure 4:
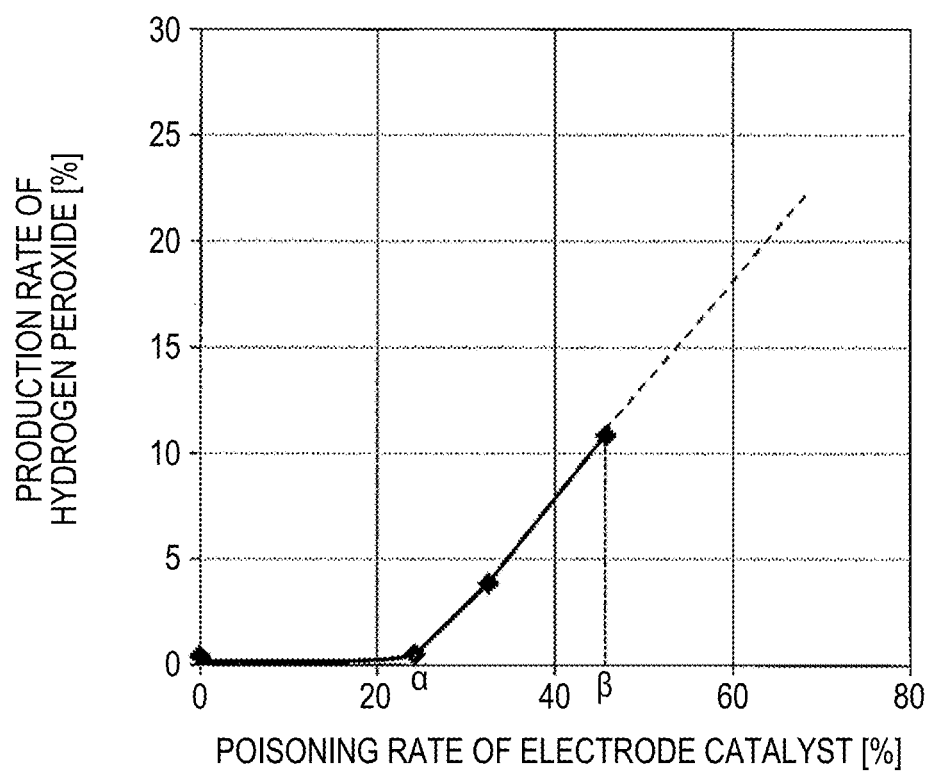
FIG. 4 is a graph illustrating a relationship between a poisoning rate of an electrode catalyst and a production rate of hydrogen peroxide at a predetermined current density in a predetermined operation state of a fuel cell element according to the embodiment.

FIG. 4 is a graph illustrating a relationship between the poisoning rate of the electrode catalyst and a production rate of hydrogen peroxide at a predetermined current density in a predetermined operation state of a fuel cell element according to the embodiment. In FIG. 4, a relationship between the poisoning rate of the electrode catalyst and the production rate of hydrogen peroxide at a current density 0.2 $A/cm^2$ in an operation state with a relative humidity of 165% RH of a fuel-cell element 110 is illustrated. Here, the "production rate of hydrogen peroxide" is calculated a value [%] obtained by multiplying a quotient, which is obtained by dividing an amount of generated hydrogen peroxide knoll by a sum of an amount of water knoll produced in power generation and an amount of hydrogen peroxide produced [mol], by 100. As illustrated in FIG. 4, the production rate of hydrogen peroxide is slight when the poisoning rate of the electrode catalyst is equal to or less than the prescribed value α, but the production rate of hydrogen peroxide increases suddenly with an increase of the poisoning rate of the electrode catalyst when the poisoning rate of the electrode catalyst is greater than the prescribed value α. In the determination step S20, the poisoning-countermeasure processing unit 710 of the control unit 700 determines whether the poisoning rate of the electrode catalyst calculated in the poisoning rate acquiring step S10 is equal to or greater than the prescribed value α or is an arbitrary value β greater than the prescribed value α based on the prescribed value α stored in advance.

Then, as illustrated in FIG. 2, a potential maintaining operation of maintaining the potential of the fuel-cell element 110 in a first potential range is performed when the poisoning rate of the electrode catalyst calculated in the poisoning rate acquiring step S10 is an arbitrary value β greater than the prescribed value α (a potential maintaining operation performing step S30).

In the potential maintaining operation performing step S30, the poisoning-countermeasure processing unit 710 of the control unit 700 performs the potential maintaining operation when it is determined in the determination step S20 that the poisoning rate of the electrode catalyst is an arbitrary value β greater than the prescribed value α. On the other hand, the poisoning-countermeasure processing unit 710 of the control unit 700 ends this control of the fuel cell system when it is determined in the determination step S20 that the poisoning rate of the electrode catalyst is equal to or less than the prescribed value α.

In the potential maintaining operation, the poisoning-countermeasure processing unit 710 changes gas supplied to the fuel-cell element 110 via the cathode gas supply passage 48 from oxygen gas supplied from the oxygen gas supply unit 42 to nitrogen gas supplied from the nitrogen gas supply unit 44 by switching the switching valve 46. Accordingly, in this state, hydrogen gas is supplied to the anode electrode of the fuel-cell element 110 and nitrogen gas is supplied to the cathode electrode. In this state, the poisoning-countermeasure processing unit 710 connects a positive electrode and a negative electrode of the secondary battery 300 to a negative electrode (a negative electrode at the time of generation of electric power) and a positive electrode (a positive electrode at the time of generation of electric power) of the fuel cell 100 by controlling the switch circuit 450. By further controlling the fuel-cell converter 200 and the secondary-battery converter 400, the poisoning-countermeasure processing unit 710 supplies electric power to the fuel cell 100 from the secondary battery 300 and performs a proton pumping process of sweeping the potential of the fuel-cell element 110 from a lower limit (for example, −0.5 V) of the first potential range to an upper limit (for example, less than 0.1 V) at a predetermined rate (for example, 20 mV/sec).

Accordingly, by maintaining the potential of the fuel-cell element 110 at a potential lower than that in a potential changing operation which will be described later and reducing an oxidized catalyst metal surface of the electrode catalyst, an interaction between the electrode catalyst and a poisoning contributor (such as an organic material including a polar functional group) is curbed, and adsorption of the poisoning contributor on the electrode catalyst is decreased. Since hydrogen gas ($H_2$) is produced in the cathode electrode of the fuel-cell element 110 by causing protons ($H^+$) diffused from the anode electrode and electrons ($e^-$) supplied from the secondary battery 300 to react with each other, the poisoning contributor is softened with the heat of reaction thereof and an action of pushing up the poisoning contributor with the hydrogen gas is carried out. Accordingly, it is possible to decrease a minimum number of cycles of the potential changing operation of being able to decrease the poisoning rate of the electrode catalyst of the fuel-cell element 110 from an arbitrary value β to the prescribed value α (target value).

Then, as illustrated in FIG. 2, the minimum number of cycles of the potential changing operation of being able to decrease the poisoning rate of the electrode catalyst to the prescribed value α (target value) is calculated as an optimal number of cycles based on a predetermined relationship between the number of cycles of the potential changing operation and the poisoning rate of the electrode catalyst (an optimal cycle number calculating step S40).

Figure 5:
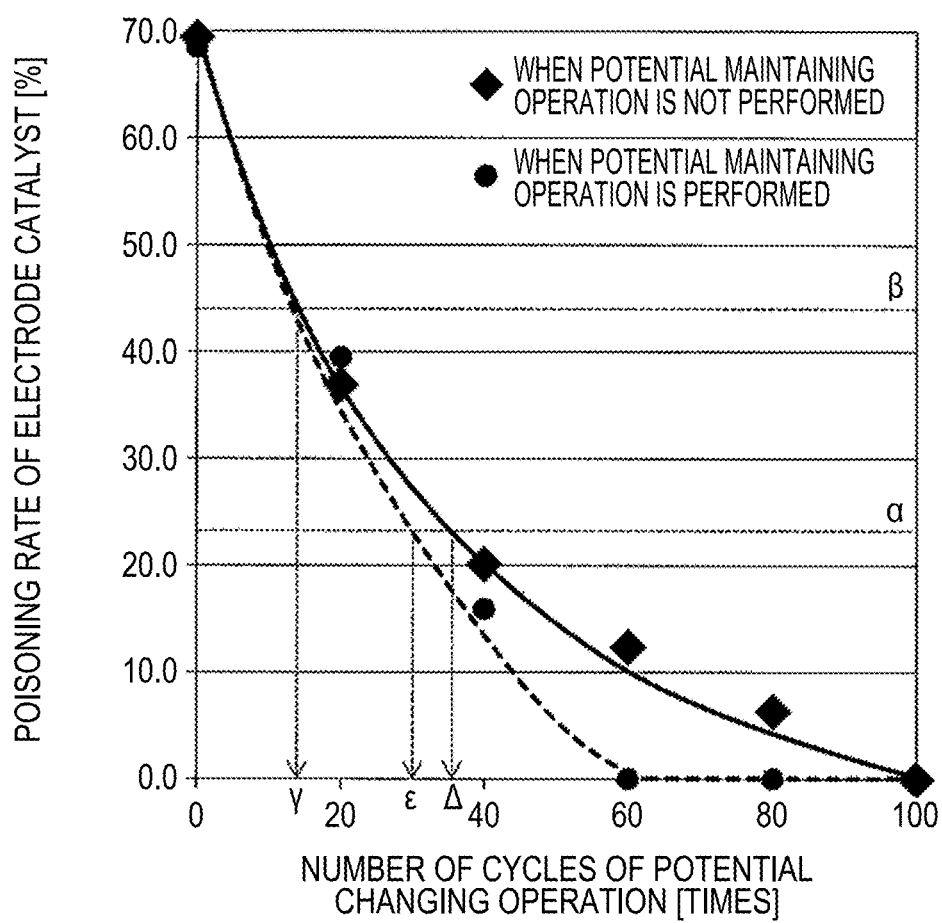
FIG. 5 is a graph illustrating a predetermined relationship between the number of cycles of a potential changing operation and the poisoning rate of the electrode catalyst according to the embodiment.

FIG. 5 is a graph illustrating a predetermined relationship between the number of cycles of the potential changing operation and the poisoning rate of the electrode catalyst according to the embodiment. In FIG. 5, a relationship between the number of cycles of the potential changing operation and the poisoning rate of the electrode catalyst when the poisoning rate of the electrode catalyst is performed after the potential maintaining operation has been performed on the fuel-cell element 110 in which the poisoning rate of the electrode catalyst is 70% is illustrated along with the relationship therebetween when the potential changing operation is performed on the fuel-cell element 110 in the same state without performing the potential maintaining operation thereon. As illustrated in FIG. 5, in both of the case in which the potential changing operation is performed and the case in which the potential changing operation is not performed, the poisoning rate of the electrode catalyst decreases in inverse proportion to the number of cycles of the potential changing operation. The curves in the two cases teach that a poisoning contributor with a weak adsorptive force on the electrode catalyst can be removed regardless of whether the potential changing operation is performed and the poisoning contributor with a weak adsorptive force on the electrode catalyst can be easily removed by performing the potential changing operation. When the potential maintaining operation is not performed, the poisoning rate of the electrode catalyst decreases to 0% by repeating the cycle of the potential changing operation 100 times. When the potential changing operation is performed, the poisoning rate of the electrode catalyst decreases to 0% by repeating the cycle of the potential changing operation 60 times. It can be seen from FIG. 5 that the minimum number of cycles of the potential changing operation of being able to decrease the poisoning rate of the electrode catalyst from an arbitrary value β to the prescribed value α is (ε−γ) when the potential changing operation is performed and can be decreased by (Δ−ε) in comparison with the case in which the potential changing operation is not performed.

The poisoning-countermeasure processing unit 710 of the control unit 700 stores the relationship between the number of cycles of the potential changing operation and the poisoning rate of the electrode catalyst when the potential changing operation is performed after the potential maintaining operation has been performed on the fuel-cell element 110 in which the poisoning rate of the electrode catalyst is 70% in advance. In the optimal cycle number calculating step S40, the poisoning-countermeasure processing unit 710 of the control unit 700 calculates the minimum number of cycles (ε−γ) of the potential changing operation of being able to decrease the poisoning rate of the electrode catalyst from an arbitrary value β to the prescribed value α as the optimal number of cycles based on the relationship between the number of cycles of the potential changing operation and the poisoning rate of the electrode catalyst when the potential changing operation is performed after the potential maintaining operation has been performed on the fuel-cell element 110 in which the poisoning rate of the electrode catalyst is 70%.

Then, as illustrated in FIG. 2, a potential changing operation of repeating a cycle of changing the potential of the fuel-cell element 110 between an upper-limit potential and a lower-limit potential of a second potential range higher than the first potential range by the optimal number of cycles is performed (a potential changing operation performing step S50).

Figure 6:
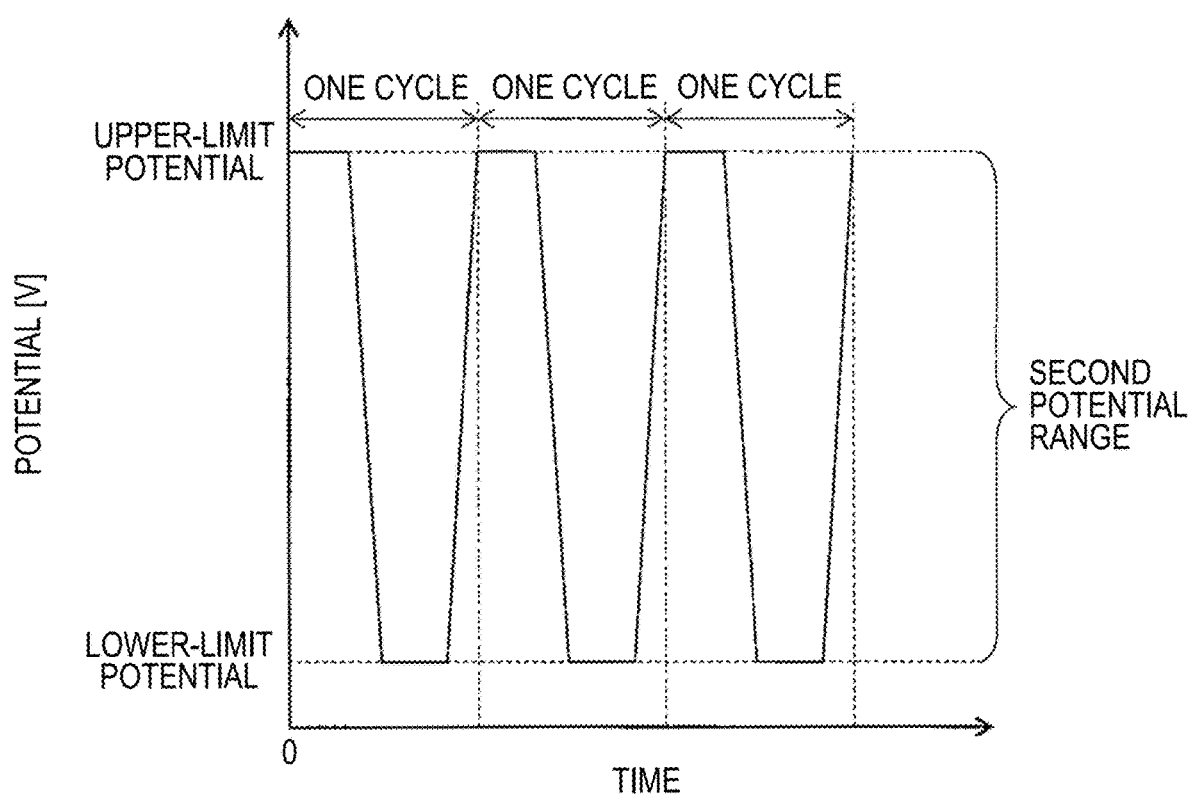
FIG. 6 is a graph illustrating a change in potential of a fuel cell element in the potential changing operation according to the embodiment.

FIG. 6 is a graph illustrating a change in potential of a fuel-cell element in the potential changing operation according to the embodiment. In the potential changing operation performing step S50, the poisoning-countermeasure processing unit 710 of the control unit 700 changes gas supplied to the fuel-cell element 110 via the cathode gas supply passage 48 from nitrogen gas supplied from the nitrogen gas supply unit 44 to oxygen gas supplied from the oxygen gas supply unit 42 by switching the switching valve 46. Accordingly, in this state, hydrogen gas is supplied to the anode electrode of the fuel-cell element 110 and oxygen gas is supplied to the cathode electrode. In this state, the poisoning-countermeasure processing unit 710 connects the positive electrode and the negative electrode of the secondary battery 300 to the positive electrode and the negative electrode of the fuel cell 100 by controlling the switch circuit 450. Thereafter, by further controlling the fuel-cell converter 200 and the secondary-battery converter 400, the poisoning-countermeasure processing unit 710 performs a potential changing operation of changing the output current and the output voltage of the fuel cell 100 which are measured by the current meter IM and the first voltage meter VM1 such that the cycle of changing the potential of the fuel-cell element 110 between the upper-limit potential (for example, 0.9 V) and the lower-limit potential (for example, 0.1 V) of the second potential range higher than the first potential range is repeated by the optimal number of cycles as illustrated in FIG. 6. With this potential changing operation, a poisoning contributor adsorbed on the electrode catalyst is removed by oxidation when the potential of the fuel-cell element 110 increases. On the other hand, when the potential of the fuel-cell element 110 decreases, an adsorptive force of the poisoning contributor on the electrode catalyst decreases and the output current of the fuel-cell element 110 increases to produce water in the fuel-cell element 110, whereby an action of washing away the poisoning contributor with the produced water can be achieved. Accordingly, it is possible to remove the poisoning contributor. As a result, it is possible to decrease the poisoning rate of the electrode catalyst of the fuel-cell element 110 from an arbitrary value β to the prescribed value α. After the potential changing operation performing step S50, the poisoning-countermeasure processing unit 710 of the control unit 700 performs the poisoning rate acquiring step S10 again.

With the control method for a fuel cell system according to the embodiment, the minimum number of cycles of the potential changing operation of being able to decrease the poisoning rate of the electrode catalyst of the fuel-cell element 110 from an arbitrary value β to the prescribed value α (target value) can be decreased by performing the potential maintaining operation. The poisoning rate of the electrode catalyst can be decreased to the prescribed value α by repeating the cycle of the potential changing operation by the optimal number of cycles after calculating the minimum number of cycles of the potential changing operation as the optimal number of cycles. Accordingly, by performing the potential changing operation, it is possible to curb an increase in a production rate of hydrogen peroxide in the fuel-cell element 110 and thus to curb damaging of the electrolyte membrane. In addition, by decreasing the number of cycles of the potential changing operation, it is possible to curb coarsening of catalyst metal particles through repeated extraction and reaggregation of catalyst metal used for the electrode catalyst and thus to curb deterioration of the electrode catalyst. It is possible to decrease noise which is generated in the cycle of the potential changing operation and to curb a decrease in fuel efficiency due to the potential changing operation.

Details of the control method for a fuel cell system according to the embodiment will be described below.

1. Poisoning Rate Acquiring Step

In the poisoning rate acquiring step, a poisoning rate of an electrode catalyst of a fuel-cell element is acquired.

The method of acquiring the poisoning rate of the electrode catalyst is not particularly limited and, for example, a method of measuring the current density Pa when the potential of a fuel-cell element is close to 0.9 V by cyclic voltammetry using an external meter and then calculating the poisoning rate of the electrode catalyst of the fuel-cell element from the current density Pa using Expression (1) may be employed such as the control method according to the embodiment.

The current densities Pa and Pb in Expression (1) are not particularly limited as long as they can define the poisoning rate of the electrode catalyst, and may be current densities when the potential has a value other than 0.9 V (for example, 0.85 V) as long they are current densities when the potential is close to 0.9 V. The current densities Pa0 and Pb0 in Expression (1) are not particularly limited as long as they can define the poisoning rate of the electrode catalyst, and may be current densities when the potential has a value other than 0.4 V (for example, 0.3 V) as long as they are current densities when the potential is close to 0.4 V.

2. Potential Maintaining Operation Performing Step

In the potential maintaining operation performing step, when the poisoning rate of the electrode catalyst is greater than the prescribed value α, the potential maintaining operation of maintaining the potential of a fuel-cell element in the first potential range is performed. Here, the "potential of a fuel-cell element" represents the potential of the cathode electrode with respect to the anode electrode of the fuel-cell element.

The prescribed value α of the poisoning rate of the electrode catalyst is not particularly limited and is, for example, a value at which the production rate of hydrogen peroxide increases to cause a problem of damaging of the electrolyte membrane when the poisoning rate of the electrode catalyst is greater than the prescribed value α.

The method of performing the potential maintaining operation is not particularly limited as long as it can maintain the potential of a fuel-cell element in the first potential range lower than the second potential range, and, for example, a method of performing a proton pumping process of maintaining the potential of a fuel-cell element in the first potential range such as the method of performing the potential maintaining operation according to the embodiment may be employed. Here, the "proton pumping process" is a process of causing a proton reaction of producing $H_2$ in the cathode electrode by producing protons $H^+$ in the anode electrode and moving the protons $H^+$ to the cathode electrode via the electrolyte membrane. An example of the method of performing the proton pumping process of maintaining the potential of a fuel-cell element in the first potential range is a method of performing a proton pumping process of sweeping the potential of the fuel-cell element from a lower-limit potential (for example, a potential equal to or greater than –0.5 V) of the first potential range to an upper-limit potential (for example, a potential less than 0.2 V) at a predetermined rate (for example, 20 mV/sec) in a state in which hydrogen gas is supplied to the anode electrode of the fuel-cell element and nitrogen gas is supplied to the cathode electrode. An example of the proton pumping process which is performed by this method may be a process of sweeping the potential of a fuel-cell element in the first potential range. For example, the method of supplying gas to the cathode electrode in the proton pumping process may be a method of supplying inert gas such as nitrogen gas, helium gas, neon gas, or argon gas to the cathode electrode or a method of not supplying gas to the cathode electrode.

The method of performing the potential maintaining operation may be a method of maintaining the potential of a fuel-cell element in the first potential range when the fuel cell is caused to generate electric power by supplying hydrogen gas to the anode electrode of the fuel-cell element and supplying oxygen gas to the cathode electrode. With this method, an oxidized catalyst metal surface of the electrode catalyst can be reduced by maintaining the potential of the fuel-cell element at a potential lower than the second potential range, and a poisoning contributor can be washed away with produced water by producing water in the cathode electrode. Accordingly, it is possible to more effectively develop a poisoning decreasing action using the potential changing operation and to decrease the optimal number of cycles of the potential changing operation. The method of maintaining the potential of a fuel-cell element in the first potential range when the fuel cell is caused to generate electric power by supplying hydrogen gas to the anode electrode of the fuel-cell element and supplying oxygen gas to the cathode electrode may employ, for example, a method of maintaining the potential of the fuel-cell element at a potential equal to or less than 0.2 V (for example, 0.2 V, which may be a potential less than 0.2 V according to the second potential range) for five minutes or the more (for example, 1 hour).

3. Potential Changing Operation Performing Step

In the potential changing operation performing step, the potential changing operation of repeating a cycle in which the potential of a fuel-cell element is changed between the upper-limit potential and the lower-limit potential of the second potential range higher than the first potential range is performed after the potential maintaining operation has been performed.

The upper-limit potential of the second potential range is not particularly limited as long as an effect of removing a poisoning contributor can be achieved, and preferably ranges, for example, from 0.8 V to 1.0 V. This is because the poisoning contributor can be effectively removed by oxidation when the upper-limit potential is equal to or greater than the lower limit of the range. This is also because deterioration of the electrode catalyst can be curbed when the upper-limit potential is equal to or less than the upper limit of the range. The lower-limit potential of the second potential range is not particularly limited as long as it is higher than the first potential range and an effect of removing a poisoning contributor can be achieved, and preferably ranges, for example, from 0.1 V to 0.2 V. This is because an excessive amount of water can be prevented from being produced when the lower-limit potential is equal to or greater than the lower limit of the range. This is also because an effect of washing away the poisoning contributor using the produced water can be effectively enhanced when the lower-limit potential is equal to or less than the upper limit of the range.

A time period of one cycle of the potential changing operation is not particularly limited as long as an effect of removing a poisoning contributor can be achieved, and preferably ranges, for example, from 1 second to 3 seconds.

This is because the effect of removing the poisoning contributor is effective when the time period of one cycle is in this range.

4. Optimal Cycle Number Calculating Step

The control method for a fuel cell system according to the embodiment can preferably employ a method of further performing a step of calculating the number of cycles of the potential changing operation of being able to decrease the poisoning rate of the electrode catalyst to a target value as the optimal number of cycles (an optimal cycle number calculating step) based on a predetermined relationship between the number of cycles of the potential changing operation and the poisoning rate of the electrode catalyst and repeating the cycle by the optimal number of cycles in the potential changing operation. This is because the cycle of the potential changing operation can be repeated by the number of cycles in which the poisoning rate of the electrode catalyst can be decreased to the target value.

Specifically, an example of the predetermined relationship between the number of cycles of the potential changing operation and the poisoning rate of the electrode catalyst is a relationship between the number of cycles of the potential changing operation and the poisoning rate of the electrode catalyst when the potential changing operation is performed on a fuel-cell element after the potential maintaining operation has been performed thereon.

The predetermined relationship between the number of cycles of the potential changing operation and the poisoning rate of the electrode catalyst may be determined in advance by experiment or simulation based on the configurations of the fuel-cell element and the fuel cell system and the conditions of the potential changing operation and the potential maintaining operation.

The target value of the poisoning rate of the electrode catalyst is not particularly limited and is preferable a value equal to or less than the prescribed value α. The optimal number of cycles is not particularly limited as long as it is the number of cycles of the potential changing operation of being able to decrease the poisoning rate of the electrode catalyst to the target value, and a minimum number of cycles of the potential changing operation of being able to decrease the poisoning rate of the electrode catalyst to the target value can be preferably employed.

While the control method for a fuel cell system according to an embodiment of the disclosure has been described above in detail, the disclosure is not limited to the embodiment and can be subject various changes in design without departing from the spirit of the disclosure described in the appended claims.

What is claimed is:

1. A control method for a fuel cell system, the control method comprising:
   acquiring a poisoning rate of an electrode catalyst of a fuel cell; and
   in response to the poisoning rate of the electrode catalyst being greater than a prescribed value,
   performing a potential maintaining operation of maintaining a potential of the fuel cell in a first potential range, wherein in the potential maintaining operation,
      hydrogen gas is supplied to an anode electrode of the fuel cell,
      inert gas is supplied to a cathode electrode of the fuel cell, and
      a proton pumping process is performed for sweeping the potential of the fuel cell from a lower-limit potential of the first potential range to an upper-limit potential of the first potential range at a predetermined rate; and
   after the potential maintaining operation has been performed, performing a potential changing operation of repeating a cycle in which the potential of the fuel cell is changed between an upper-limit potential and a lower-limit potential of a second potential range which is higher than the first potential range, wherein
   the upper-limit potential of the first potential range is equal to or lower than the lower-limit potential of the second potential range,
   in the potential changing operation, the gas supplied to the cathode electrode is changed from the inert gas to oxygen gas, and
   a minimum number of cycles of the potential changing operation, which is performed after the potential maintaining operation, to decrease the poisoning rate of the electrode catalyst to the prescribed value is less than a minimum number of cycles of the potential changing operation, which is performed without the potential maintaining operation.

2. The control method according to claim 1, further comprising:
   calculating the minimum number of cycles of the potential changing operation, which is performed after the potential maintaining operation, based on a predetermined relationship between a number of cycles of the potential changing operation and the poisoning rate of the electrode catalyst,
   wherein the potential changing operation includes repeating the cycle a number of times corresponding to the minimum number of cycles.

3. The control method according to claim 1, wherein
the lower-limit potential of the first potential range is equal to or greater than −0.5 V, and
the upper-limit potential of the first potential range is less than 0.2 V.

4. The control method according to claim 1, wherein
the upper-limit potential of the second potential range is 0.8 V to 1.0 V.

* * * * *